United States Patent
Scaringe

(10) Patent No.: US 11,420,532 B2
(45) Date of Patent: Aug. 23, 2022

(54) SYSTEMS AND METHODS FOR MONITORING AND ENHANCING UTILIZATION OF BATTERIES FOR ELECTRIC VEHICLES BASED ON VEHICLE USAGE

(71) Applicant: Rivian IP Holdings, LLC, Irvine, CA (US)

(72) Inventor: Robert J. Scaringe, Plymouth, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 405 days.

(21) Appl. No.: 15/349,205

(22) Filed: Nov. 11, 2016

(65) Prior Publication Data
US 2017/0129361 A1 May 11, 2017

Related U.S. Application Data

(60) Provisional application No. 62/254,166, filed on Nov. 11, 2015.

(51) Int. Cl.
*B60L 58/16* (2019.01)
*G06Q 20/08* (2012.01)
(Continued)

(52) U.S. Cl.
CPC ............ *B60L 58/16* (2019.02); *B60L 3/12* (2013.01); *B60L 58/18* (2019.02);
(Continued)

(58) Field of Classification Search
CPC ...... B60L 11/1861; B60L 58/12; B60L 58/16; B60L 53/65; B60L 3/12; B60L 2250/20;
(Continued)

(56) References Cited

U.S. PATENT DOCUMENTS

| | | | |
|---|---|---|---|
| 9,079,505 B1 | 7/2015 | Hyde et al. | |
| 2010/0079004 A1* | 4/2010 | Keefe | B60L 53/63 307/80 |

(Continued)

OTHER PUBLICATIONS

International Search Report dated Jan. 30, 2017 for corresponding International Application No. PCT/US2016/061505.
(Continued)

*Primary Examiner* — Richard Isla
*Assistant Examiner* — Manuel Hernandez
(74) *Attorney, Agent, or Firm* — Haley Guiliano LLP

(57) ABSTRACT

Methods and systems for monitoring and optimizing utilization of batteries for electric vehicles are described. Data of battery usage of electric vehicles are monitored using battery monitoring sensors at the electric vehicles for a plurality of users who share use of electric vehicles. Battery usage metrics are determined for the batteries of the electric vehicles based on the data of battery usage and determining user impact metrics based on measured quantities relating to driving of the electric vehicles for the plurality of users, the user impact metrics being indicative of degrees of driving severity placed on the vehicles associated with use habits of particular users. The battery usage metrics and the user impact metrics for the plurality of users are analyzed at a computer processing system to determine a particular user to assign to a particular electric vehicle in a given time period to counteract battery degradation of the battery in a particular electric vehicle, and a particular user is paired with the particular electric vehicle.

19 Claims, 6 Drawing Sheets

(51) Int. Cl.
*B60L 3/12* (2006.01)
*B60L 58/18* (2019.01)
*G07C 5/00* (2006.01)
*G07C 5/02* (2006.01)
*H02J 7/00* (2006.01)
*B60L 58/12* (2019.01)
*B60L 53/65* (2019.01)

(52) U.S. Cl.
CPC ......... *G06Q 20/0855* (2013.01); *G07C 5/008* (2013.01); *G07C 5/02* (2013.01); *H02J 7/0021* (2013.01); *B60L 53/65* (2019.02); *B60L 58/12* (2019.02); *B60L 2240/545* (2013.01); *B60L 2240/547* (2013.01); *B60L 2240/549* (2013.01); *B60L 2240/625* (2013.01); *B60L 2250/20* (2013.01); *B60L 2260/50* (2013.01); *H02J 7/00032* (2020.01); *H02J 7/0047* (2013.01)

(58) Field of Classification Search
CPC ......... B60L 2240/662; B60L 2240/625; B60L 2240/549; B60L 2240/547; B60L 2240/545; B60L 2260/50; B60L 58/18; H02J 7/1461; H02J 7/0021; H02J 7/0047; H02J 7/00032; G07C 5/02; G07C 5/008; G06Q 20/0855; Y04S 30/14; Y02T 90/128; Y02T 90/14; Y02T 90/121; Y02T 90/169; Y02T 90/163; Y02T 90/162; Y02T 90/16; Y02T 10/7291; Y02T 10/7072; Y02T 10/705; Y02T 10/7044; Y02T 10/7005
USPC .......................................................... 320/134
See application file for complete search history.

(56) References Cited

U.S. PATENT DOCUMENTS

| | | | |
|---|---|---|---|
| 2010/0230188 A1 | 9/2010 | Nguyen | |
| 2011/0082621 A1 | 4/2011 | Berkobin et al. | |
| 2011/0224868 A1* | 9/2011 | Collings, III | G01C 21/26 701/33.4 |
| 2012/0065834 A1* | 3/2012 | Senart | G07C 5/008 701/31.4 |
| 2013/0244210 A1* | 9/2013 | Nath | G07C 5/008 434/65 |
| 2014/0129080 A1* | 5/2014 | Leibowitz | B60R 16/023 701/33.3 |
| 2014/0162219 A1* | 6/2014 | Stankoulov | G09B 19/167 434/65 |
| 2014/0188304 A1* | 7/2014 | Richter | B60L 3/00 701/1 |
| 2014/0195310 A1* | 7/2014 | McQuade | G07C 5/008 705/7.39 |
| 2014/0279707 A1* | 9/2014 | Joshua | G06Q 30/0283 705/400 |
| 2015/0039350 A1* | 2/2015 | Martin | G06Q 30/0261 705/4 |
| 2015/0228129 A1* | 8/2015 | Cox | G01S 19/13 701/29.1 |
| 2015/0239365 A1* | 8/2015 | Hyde | B60L 11/1861 701/2 |
| 2016/0039295 A1* | 2/2016 | Madurai-Kumar | B60L 11/184 320/109 |
| 2016/0292768 A1* | 10/2016 | Needham | G06Q 30/0631 |
| 2016/0364823 A1* | 12/2016 | Cao | G06Q 50/30 |
| 2017/0197678 A1* | 7/2017 | Scaringe | G06Q 30/0645 |

OTHER PUBLICATIONS

Written Opinion dated Jan. 30, 2017 for corresponding International Application No. PCT/US2016/061505.

* cited by examiner

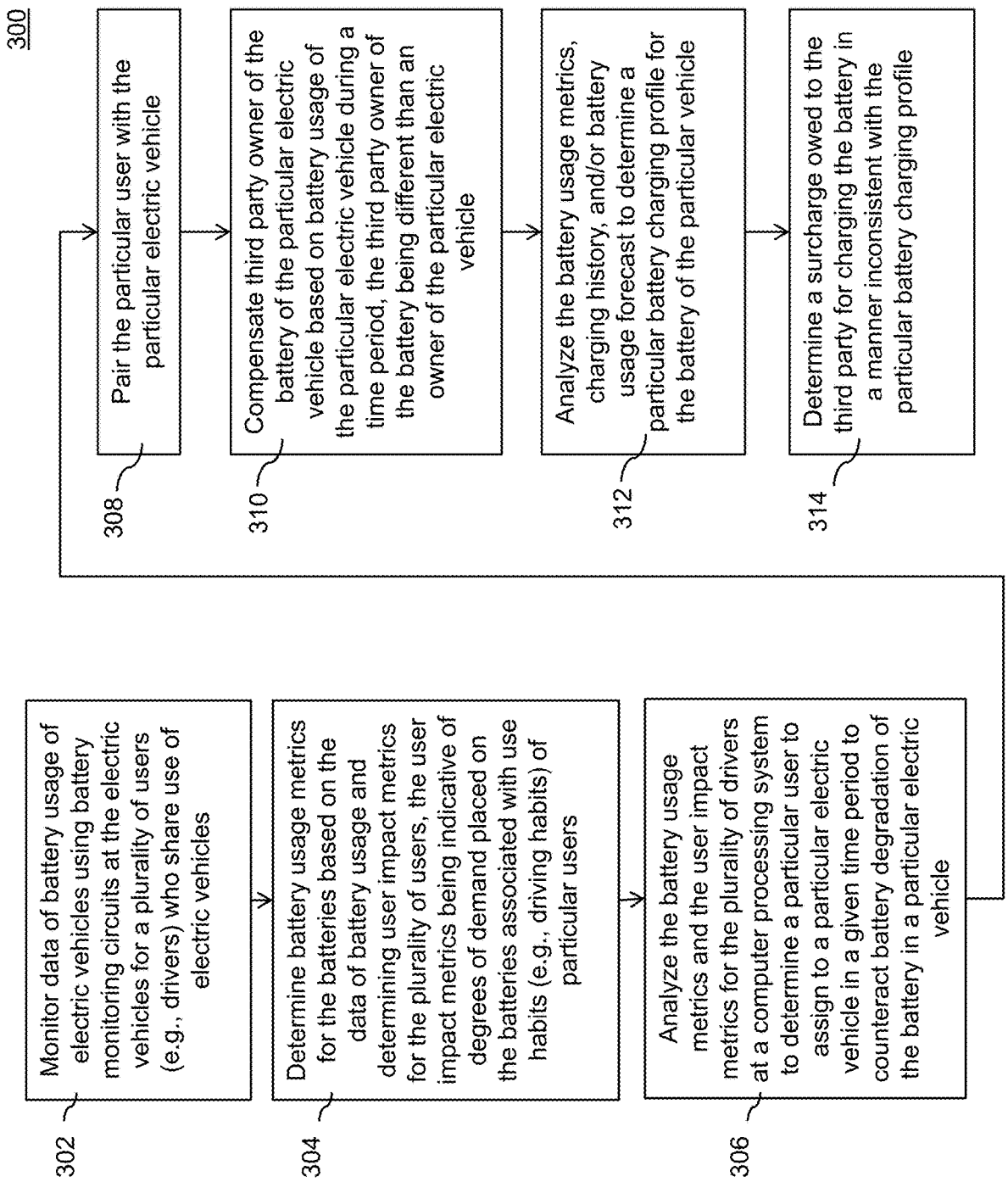

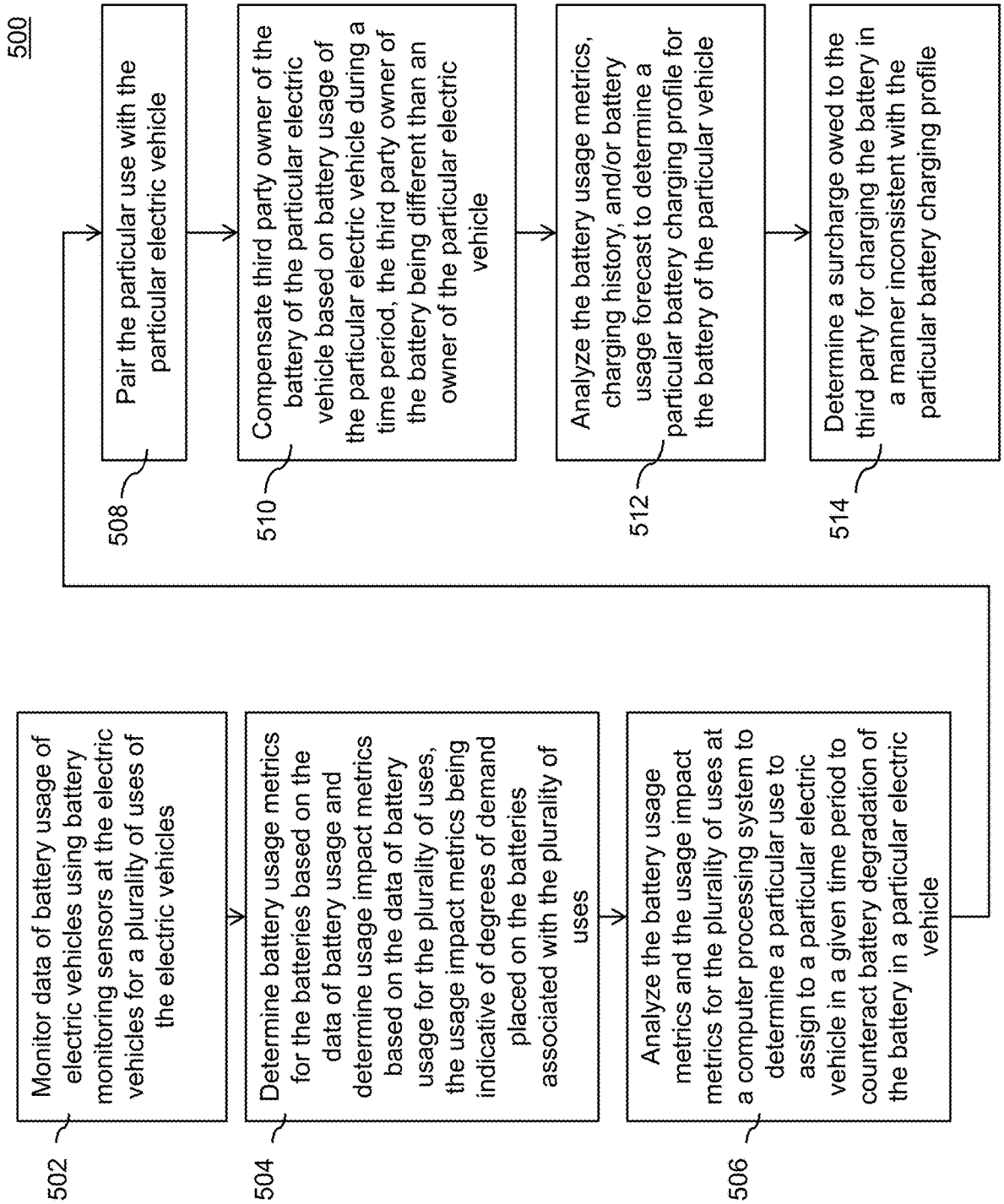

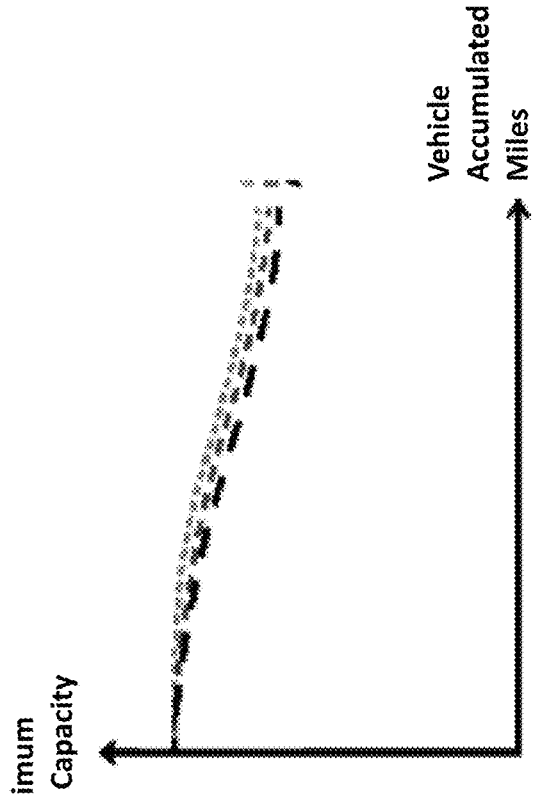

FIG. 6B

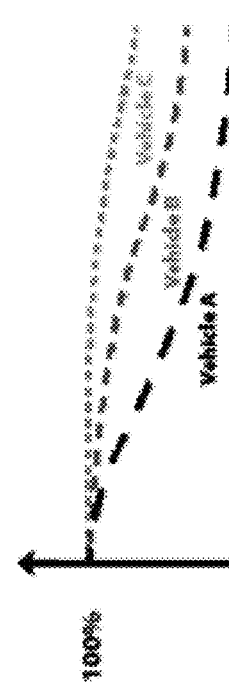

FIG. 6A

Exemplary maximum battery capacity for different electric vehicles for different users (or different uses) in an ordinary sole ownership scenario (repetitive same user or same use)

Improved, more uniform maximum battery capacity for different electric vehicles serving multiple users (or multiple uses) in a multi-user (or multi-use), shared vehicle pool with intelligent, dynamic pairing of vehicles with users/uses

SYSTEMS AND METHODS FOR MONITORING AND ENHANCING UTILIZATION OF BATTERIES FOR ELECTRIC VEHICLES BASED ON VEHICLE USAGE This application claims the benefit of U.S. Provisional Patent Application No. 62/254,166 filed Nov. 11, 2015 entitled "Systems and Methods for Monitoring and Enhancing Utilization of Batteries for Electric Vehicles," the entire contents of which are incorporated herein by reference.

BACKGROUND

Field of the Disclosure

The present disclosure relates to batteries for electric vehicles and hybrid vehicles and more particularly to methods and systems for monitoring and enhancing utilization of batteries for electric vehicles, including hybrid vehicles.

Background Information

Electric vehicles, including hybrid vehicles, are of great interest for transportation applications and can provide benefits of low or zero emissions, quiet operation, and reduced dependence upon fossil fuels. Conventional batteries for electric vehicles may include lithium-ion batteries, nickel-metal-hydride batteries, cobalt dioxide batteries, and others. Common challenges associated with battery systems for electric vehicles include the high capital cost of the batteries themselves, reduction in charging/discharging performance over time, reduction in energy storage capacity over time, and variability in performance among batteries.

The present inventor has observed a need for better monitoring of battery systems for electric vehicles and for optimizing utilization of batteries for electric and hybrid vehicles. Exemplary approaches described herein may address such needs.

SUMMARY

According to an exemplary aspect of the disclosure, a method of monitoring and enhancing battery utilization for a group of electric vehicles is described. The method comprises: monitoring data of battery usage of electric vehicles using battery monitoring sensors at the electric vehicles for a plurality of users who share use of electric vehicles; determining battery usage metrics for the batteries of the electric vehicles based on the data of battery usage and determining user impact metrics based on measured quantities relating to driving of the electric vehicles for the plurality of users, the user impact metrics being indicative of degrees of driving severity placed on the vehicles associated with use habits of particular users; analyzing the battery usage metrics and the user impact metrics for the plurality of users at a computer processing system to determine a particular user to assign to a particular electric vehicle in a given time period to counteract battery degradation of the battery in a particular electric vehicle; and assigning the particular user with the particular electric vehicle.

According to another exemplary aspect of the disclosure, a system for monitoring and enhancing battery utilization for a group of electric vehicles is described. The system comprises a computer processing system and a computer memory, wherein the processing system is configured to execute steps comprising: receiving data of battery usage of electric vehicles obtained with battery monitoring sensors at the electric vehicles for a plurality of users who share use of electric vehicles; determining battery usage metrics for the batteries of the electric vehicles based on the data of battery usage and determining user impact metrics based on measured quantities relating to driving of the electric vehicles for the plurality of users, the user impact metrics being indicative of degrees of driving severity placed on the vehicles associated with use habits of particular users; analyzing the battery usage metrics and the user impact metrics for the plurality of users at a computer processing system to determine a particular user to assign to a particular electric vehicle in a given time period to counteract battery degradation of the battery in a particular electric vehicle; and assigning the particular user with the particular electric vehicle.

According to another exemplary aspect of the disclosure, a non-transitory computer readable medium comprising program instructions for monitoring and enhancing battery utilization for a group of electric vehicles is described. The program instructions when executed cause a computer processing system to execute steps comprising: receiving data of battery usage of electric vehicles using battery monitoring sensors at the electric vehicles for a plurality of users who share use of electric vehicles; determining battery usage metrics for the batteries of the electric vehicles based on the data of battery usage and determining user impact metrics based on measured quantities relating to driving of the electric vehicles for the plurality of users, the user impact metrics being indicative of degrees of driving severity placed on the vehicles associated with use habits of particular users; analyzing the battery usage metrics and the user impact metrics for the plurality of users at a computer processing system to determine a particular user to assign to a particular electric vehicle in a given time period to counteract battery degradation of the battery in a particular electric vehicle; and assigning the particular user with the particular electric vehicle.

According to another exemplary aspect of the disclosure, a method of monitoring and enhancing battery utilization for a group of electric vehicles is described. The method comprises: monitoring data of battery usage of electric vehicles using battery monitoring sensors at the electric vehicles for a plurality of uses of the electric vehicles; determining battery usage metrics for the batteries of the electric vehicles based on the data of battery usage and determining usage impact metrics based on measured quantities relating to the driving of the vehicles for the plurality of uses, the usage impact metrics being indicative of degrees of driving severity placed on the batteries associated with the plurality of uses; analyzing the battery usage metrics and the usage impact metrics for the plurality of uses at a computer processing system to determine a particular use to assign to a particular electric vehicle in a given time period to counteract battery degradation of the battery in a particular electric vehicle; and assigning the particular use with the particular electric vehicle.

According to another exemplary aspect of the disclosure, a system for monitoring and enhancing battery utilization for a group of electric vehicles is described. The system comprises a computer processing system and a computer memory, wherein the processing system is configured to execute steps comprising: receiving data of battery usage of electric vehicles obtained with battery monitoring sensors at the electric vehicles for a plurality of uses of the electric vehicles; determining battery usage metrics for the batteries of the electric vehicles based on the data of battery usage and determining usage impact metrics based on measured quantities relating to the driving of the vehicles for the plurality of uses, the usage impact metrics being indicative of degrees of driving severity placed on the batteries associated with the plurality of uses; analyzing the battery usage metrics and the usage impact metrics for the plurality of uses at a computer processing system to determine a particular use to assign to a particular electric vehicle in a given time period to counteract battery degradation of the battery in a particular electric vehicle; and assigning the particular use with the particular electric vehicle.

According to another exemplary aspect of the disclosure, a non-transitory computer readable medium comprising program instructions for monitoring and enhancing battery utilization for a group of electric vehicles is described. The program instructions when executed cause a computer processing system to execute steps comprising: receiving data of battery usage of electric vehicles obtained with battery monitoring sensors at the electric vehicles for a plurality of uses of the electric vehicles; determining battery usage metrics for the batteries of the electric vehicles based on the data of battery usage and determining usage impact metrics based on measured quantities relating to the driving of the vehicles for the plurality of uses, the usage impact metrics being indicative of degrees of driving severity placed on the batteries associated with the plurality of uses; analyzing the battery usage metrics and the usage impact metrics for the plurality of uses at a computer processing system to determine a particular use to assign to a particular electric vehicle in a given time period to counteract battery degradation of the battery in a particular electric vehicle; and assigning the particular use with the particular electric vehicle.

According to another exemplary aspect of the disclosure, a system for monitoring and enhancing battery utilization for a group of electric vehicles is described. The system comprises: means for receiving data of battery usage of electric vehicles obtained with battery monitoring sensors at the electric vehicles for a plurality of users who share use of electric vehicles; means for determining battery usage metrics for the batteries of the electric vehicles based on the data of battery usage and determining user impact metrics based on measured quantities relating to driving of the electric vehicles for the plurality of users, the user impact metrics being indicative of degrees of driving severity placed on the vehicles associated with use habits of particular users; means for analyzing the battery usage metrics and the user impact metrics for the plurality of users at a computer processing system to determine a particular user to assign to a particular electric vehicle in a given time period to counteract battery degradation of the battery in a particular electric vehicle; and means for assigning the particular user with the particular electric vehicle.

According to another exemplary aspect of the disclosure, a system for monitoring and enhancing battery utilization for a group of electric vehicles is described. The system comprises: means for receiving data of battery usage of electric vehicles obtained with battery monitoring sensors at the electric vehicles for a plurality of uses of the electric vehicles; means for determining battery usage metrics for the batteries of the electric vehicles based on the data of battery usage and determining usage impact metrics based on measured quantities relating to the driving of the vehicles for the plurality of uses, the usage impact metrics being indicative of degrees of driving severity placed on the batteries associated with the plurality of uses; means for analyzing the battery usage metrics and the usage impact metrics for the plurality of uses at a computer processing system to determine a particular use to assign to a particular electric vehicle in a given time period to counteract battery degradation of the battery in a particular electric vehicle; and means for assigning the particular use with the particular electric vehicle.

In other exemplary aspects, the battery usage metrics for the batteries comprise at least one of an average battery discharge rate, a maximum battery discharge rate, and a median battery discharge rate. In addition, user impact metrics, or usage impact metrics, may comprise at least one of average acceleration, median acceleration, and maximum acceleration attributable to the plurality of users or the plurality of uses. Compensation may be determined, e.g., by a computer processing system per computer program instructions, for a third party owner of the battery of the particular electric vehicle based on battery usage of the particular electric vehicle during a time period, the third party owner of the battery being different than an owner of the particular electric vehicle. In addition, analyzing the battery usage metrics, charging history, and/or battery usage forecast to determine a particular battery charging profile for the battery of the particular vehicle may be carried out, e.g., by a computer processing system per computer program instructions. In addition, a surcharge owed to the third party for charging the battery in a manner inconsistent with the particular battery charging profile may be determined, e.g., by a computer processing system per computer program instructions.

BRIEF DESCRIPTION OF THE FIGURES

FIG. 3 illustrates a flow chart of an exemplary approach for monitoring and enhancing utilization for a group of electric vehicles for multiple users (drivers) who share the vehicles.

FIG. 5 illustrates a flow chart of an exemplary approach for monitoring and enhancing utilization for a group of electric vehicles for multiple uses.

FIG. 6A illustrates exemplary maximum battery capacity for different electric vehicles with different users or different uses in an ordinary sole ownership scenario.

FIG. 6B illustrates exemplary improved, more uniform maximum battery capacity for different electric vehicles serving multiple users or multiple uses in a multi-user (or multi-use), shared vehicle pool with intelligent, dynamic pairing of users (or uses) and vehicles.

DETAILED DESCRIPTION OF EXEMPLARY EMBODIMENTS

Figure 1:
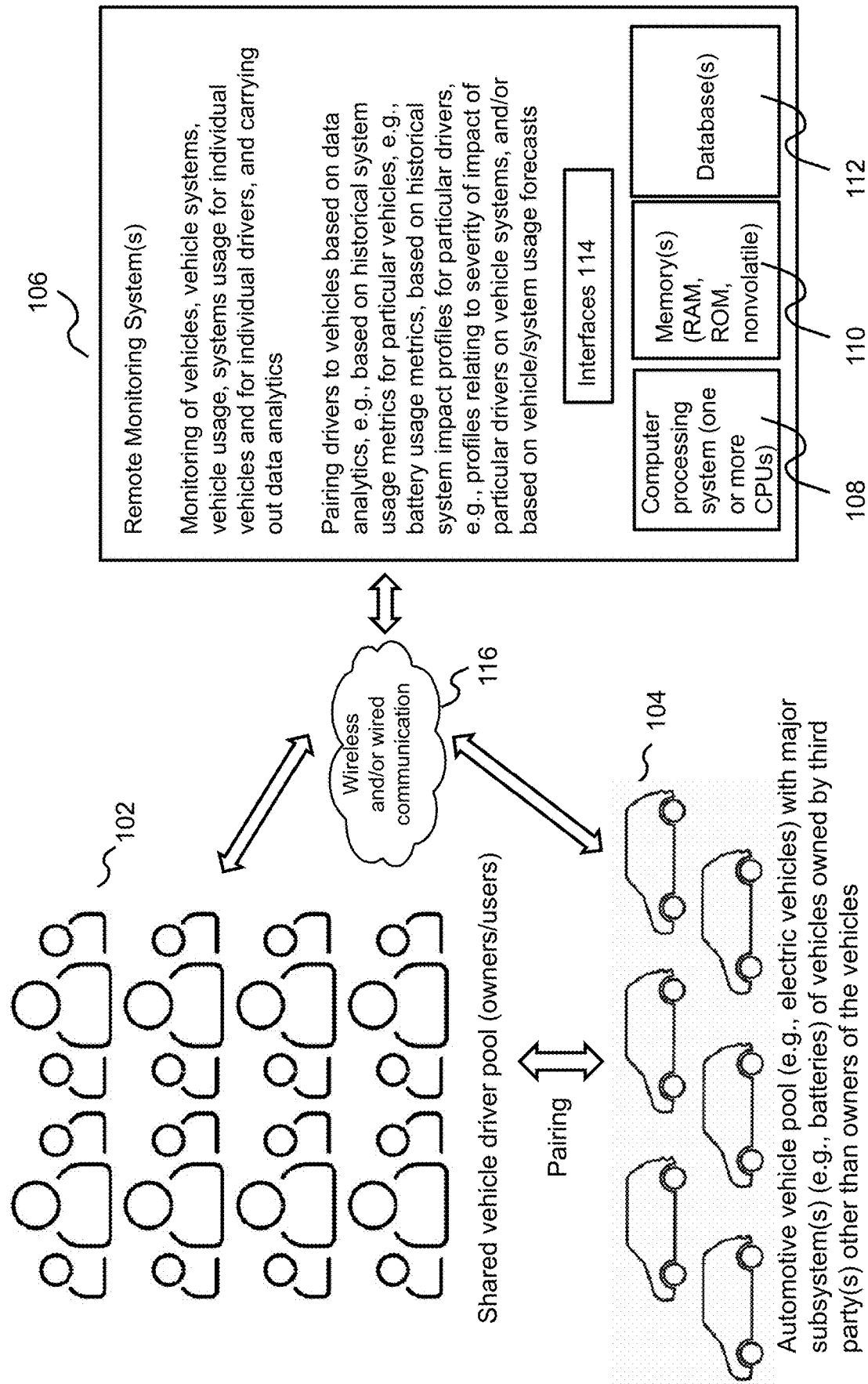
FIG. 1 illustrates an exemplary framework for an approach of monitoring and enhancing battery utilization for a group of electric vehicles according to an example of the disclosure.

FIG. 1 illustrates an exemplary framework for an approach for a method of monitoring and enhancing battery utilization for a group of electric vehicles. As shown in FIG.

1, a plurality of drivers 102 of a shared vehicle driver pool, which may comprise both vehicle owners and non-owner users of the vehicles, are to be paired with vehicles, such as electric vehicles, of an automotive vehicle pool 104. In examples described herein, major subsystems of the vehicles 104 may be owned by a third party or parties who are different than the owners of the vehicles 104 themselves. A remote monitoring system 106 under the control of a second party different than the owners of the vehicles 104 communicates with the vehicles 104 and the users 102 via wireless and/or wired communication including via a network 116 such as the Internet, through smart phones equipped with suitable applications, tablets, and/or desktop or laptop computers.

The remote monitoring system(s) 106 comprises a computer processing system 108, which and may include one or more computer processing units (CPUs) located in one or more computer systems, one or more memories 110, which may include RAM, ROM, and any suitable nonvolatile memory. The remote monitoring system 106 may also include one or more databases 112 to store data for both vehicles and drivers as will be explained further herein, and one or more interfaces 114 to facilitate communication via networks including the Internet and for facilitating input/output of data. The remote monitoring system 106 carries out monitoring of vehicles, vehicle systems, vehicle usage, and systems usage for individual vehicles and for individual drivers who use those vehicles, and carries out data analytics on the data gathered from the vehicles and the vehicle systems. In examples, the vehicles 104 may include various detectors and sensors for monitoring vehicle dynamics and usage and demand placed on vehicle systems during the driving of the vehicles 104 by particular drivers 102. For example, the vehicles may include GPS units for monitoring location, speed, and direction, battery monitoring sensors in the form of electrical circuits, for monitoring battery usage, battery discharge as a function of time, battery charging rates, and other suitable sensors for monitoring the health and status of other major systems of the vehicle and for detecting warning or fault conditions. Such data is stored in an onboard computer system with suitable memory and may be uploaded to the remote monitoring system 106 through wireless communication via a vehicle onboard wireless transceiver and/or via wired communication through a vehicle docking station(s) located at the home of a user 102 or other location.

In an example, the remote monitoring system 106 may calculate metrics of driver impact on various vehicle systems, such as the vehicle battery, for individual drivers 102 who share usage of the pool of vehicles 104. For example, the driver impact metrics may relate to degrees of demand placed on the batteries and/or other vehicle systems associated with the driving habits of particular drivers. Drivers who drive vehicles vigorously, with rapid acceleration and rapid deceleration, may be rated with metrics reflecting a greater level of severity and demand placed upon the battery system and other systems of a vehicle. Drivers who drive vehicles gently, with relatively slow acceleration and slow deceleration, may be rated with metrics reflecting a lesser level of severity and demand placed on the battery system and other subsystems of a vehicle. In order to lessen the severity of the demand over time placed upon battery systems of particular vehicles 104, the remote monitoring system 106 may select and pair a driver 102 with a particular vehicle 104 based upon the historical battery usage and metrics derived therefrom for that vehicle 104 and based on driver impact metrics for the pool of drivers 102. For example, the remote monitoring system may determine that a particular vehicle 104 has been driven with a relatively severe impact on the battery by recent users of the vehicle. In such an instance, the remote monitoring system 106 may pair a driver 102 who characteristically drives vehicles relatively gently in an effort to achieve a more balanced usage of the battery of the particular vehicle 104 over time.

For example, the braking system can be monitored, and user impact metrics based on a particular user's braking habits (or usage impact metrics corresponding to a particular usage) can be generated. Slamming on the brakes, pumping the brakes, or prolonged use of the brakes may create wear more quickly (e.g., degradation of brake pads), and such driving behavior can be quantified using a numerical metric(s) which can be indicative of the severity of usage or driver impact on the vehicle, i.e., demand placed on the vehicle. Drivers or uses that are more gentle on the brakes, for instance by more gradually slowing the vehicle down or by driving on the freeway/highway more frequently in order to reduce brake use, may be rated with less severe metrics. In addition, length of use for outings (average, median, maximum), distance driven for outings (average, median, maximum), HVAC use, and location of driving (highway/city) can be quantified in calculated metrics and can be indicative of how the electric vehicle battery is impacted. These latter factors may become more important in autonomous vehicles, as the braking and acceleration/deceleration habits will be roughly the same between multiple autonomously driven vehicles, such as reflected in connection with FIG. 4.

Accordingly, for example, numerical driver impact metrics or usage impact metrics can be calculated from sensor measurements carried out at vehicles during usage by particular drivers and/or particular uses and may include numerical metrics for one or more of: average, median, and/or maximum measured braking force attributable to a particular driver or driving use during a time period; average, median, and/or maximum speed attributable to a particular driver or driving use during a time period; average, median and/or maximum acceleration and/or deceleration attributable to a particular driver or driving use during a time period; average, median, and/or maximum battery state of charge attributable to a particular driver or driving use during a time period; average, median, and/or maximum battery current delivered to power train attributable to a particular driver or driving use during a time period; average, median, and/or maximum ambient outdoor temperature attributable to a particular driver or driving use during a time period; GPS location attributable to a particular driver or driving use during a time period (e.g., which may be used to provide numerical metrics indicative of a level of severity of terrain, e.g., numerical metrics indicative of temperate areas, mountainous areas, desert areas, etc.), and other suitable metrics that may be indicative of the severity of driver impact or severity of usage impact on a vehicle. Such numerical metrics may be calculated based on time durations of vehicle outings or for other, e.g., longer, time periods such as the cumulative time of usage of the vehicle battery. Such metrics may also be combined in mathematical combinations including combinations with other previously mentioned numerical metrics. Such metrics may be normalized using any suitable normalizations. Such metrics may be directly or indirectly related to the severity of a driver's impact or a usage's impact on a battery of a vehicle. i.e., related to demands placed on vehicle batteries by particular drivers or usages. Such metrics may also include mathematical combinations of the foregoing, such as weighted combinations of such metrics including linear combinations of such metrics, e.g., using any suitable normalizations. Such individual metrics or combination metrics may be numerical metrics indicative of measurable physical quantities such the examples noted above or other physical quantities indicative of driver impact or use impact on the electric vehicle and may be normalized using any suitable normalization.

For example, the remote monitoring system may access previously calculated battery usage metrics stored in database 112 associated with the historical usage of the battery of the particular vehicle such as, for example, average discharge rate for the battery, maximum recorded discharge rate for the battery, median recorded discharge rate for the battery, e.g., during a time period such as a cumulative usage period for the battery or a lesser time period, and/or other suitable metrics derived according to a battery management model designed to gauge the health of the battery, such as, for example, average, median, and/or maximum battery state of charge for a particular battery during a time period; battery state of health for a particular battery (e.g., based on measured ability to retain charge and maximum charge attainable); average, median, and/or maximum battery current delivered to power train for a particular battery during a time period, etc. The remote monitoring system 106 may also access previously calculated driver impact/usage metrics stored in database 112 associated with the historical usage patterns of particular users 102 who share use of vehicles 104 in the vehicle pool, in particular, driver impact/usage metrics such as battery usage metrics that are indicative of degrees of demand placed on batteries due to the driving habits of the users 102. Based on those metrics for the multiple drivers 102, the remote monitoring system may select a particular driver 102 to be paired with a particular vehicle 104 to counteract battery degradation of the battery of that particular vehicle 104, so as to achieve better balance in the battery usage for a particular vehicle 104 and enhanced life and performance of the battery of the particular vehicle 104. Of course, the remote monitoring system 106 may carry out these types of analyses continually or at specified intervals for all of the vehicles 104 and all of the users 102 so as to continually pair particular drivers 102 with particular vehicles 104 based on the most updated data in an effort to achieve a desirable balance of battery usage for all of the vehicles 104. In addition, the remote monitoring system 106 continually updates the database 112 with the most recent vehicle system usage data and driver impact data collected from sensors at the vehicles 104, such as vehicle speed, battery state of charge, battery state of health, ambient outdoor temperature, GPS location, HVAC usage, battery current delivered to powertrain, braking force, and other measurable vehicle quantities such as described herein, all of which may be logged and analyzed as a function of time, and also updates the associated vehicle system usage metrics and driver impact metrics, which may change with time, at the database 112.

Figure 2A:
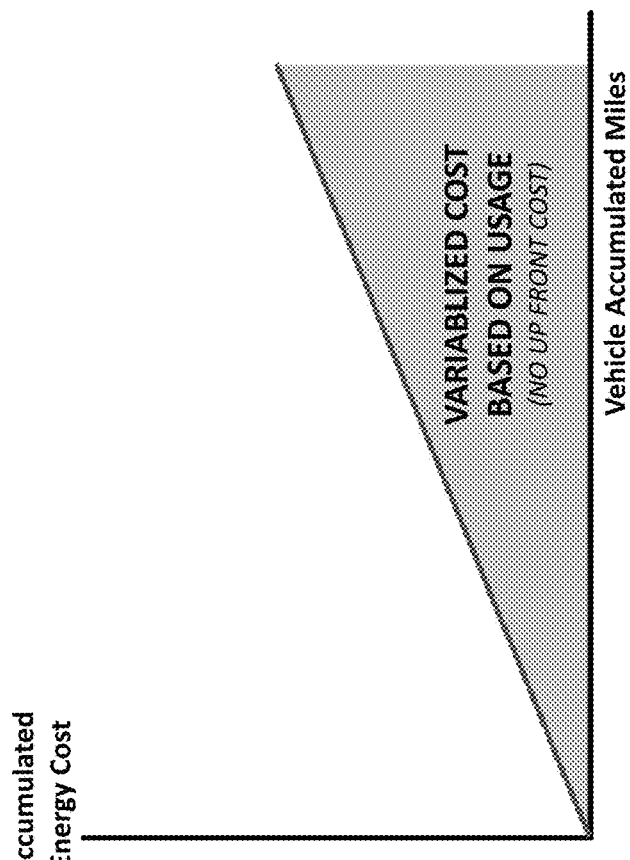
FIG. 2A illustrates a graph of accumulated energy cost to the owner of an electric vehicle in an ordinary scenario where the vehicle owner owns (and pays for) the battery of the electric vehicle.
Figure 2B:
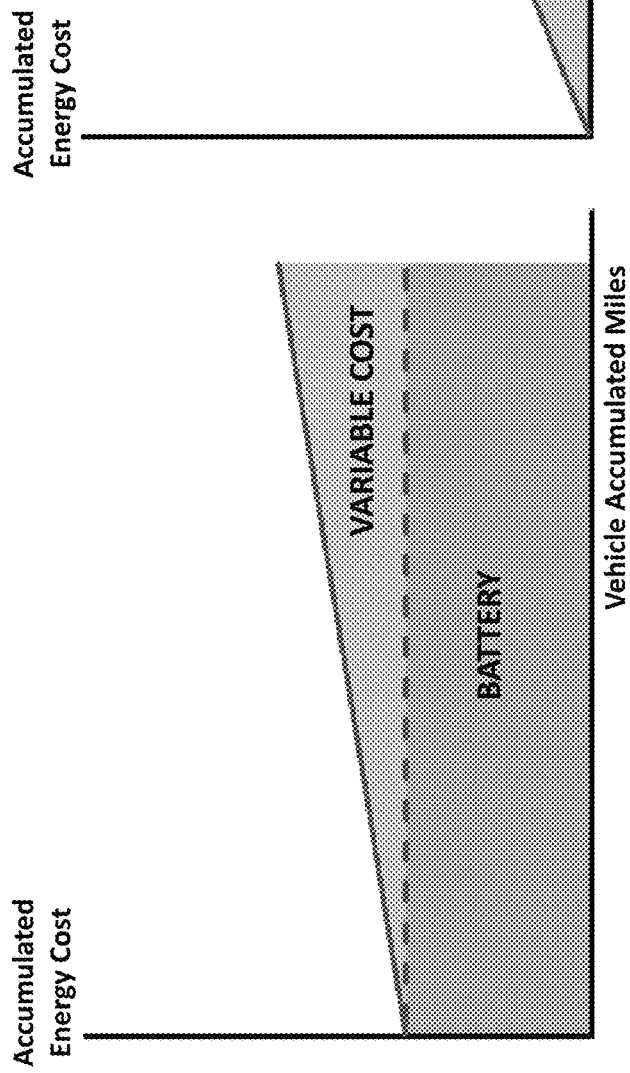
FIG. 2B shows a variabilized approach to energy cost based on usage for an electric vehicle in which a third-party, other than the vehicle owner, owns the vehicle battery system.

The framework of pairing a pool of drivers 102 with a pool of vehicles 104 (assigning particular users with particular vehicles), such as electric vehicles, can enhance utilization of electric vehicles in a manner that is cost-efficient for the users 102, of which only some or possibly none may themselves be owners of the vehicles 104. To further reduce initial capital costs to owners of the vehicles 104, selected major systems of the vehicles 104, such as the battery systems of an electric vehicles, may be owned by one or more third parties who are themselves not owners of the vehicles 104, and who may also be different from the second party that controls the remote monitoring system 106. In this regard, the third-party owner bears the initial capital cost of the battery in an electric vehicle, and the owner and/or users 102 of that vehicle need only pay for usage of the battery without incurring the initial capital cost of the battery itself. In this regard, FIG. 2A illustrates a graph of accumulated energy cost to the owner of an electric vehicle in an ordinary scenario where the vehicle owner owns (and pays for) the battery of the electric vehicle. As shown in FIG. 2A, there is an initial and significant capital cost for the battery system itself, as shown at the y-intercept of the graph. There is also a variable energy cost to the owner of the vehicle which accumulates over miles driven and depends on the cost of electricity as a function of time during which the vehicle is driven and charged. In contrast, FIG. 2B shows a variablized approach to energy cost based on usage for an electric vehicle in which a third-party, other than the vehicle owner, owns the vehicle battery system. In this case, energy cost starts at zero (the origin of the graph) for owners and/or users of the electric vehicle, i.e., the owners and/or users of the electric vehicle avoid the initial capital cost of the battery, and the usage energy cost accumulates over the number of vehicle miles according to the number of miles driven, albeit at a higher variable rate than the variable cost portion shown in FIG. 2A. The variable cost based on usage shown in FIG. 2B includes both a usage cost paid to the third party owner of the battery and the electricity cost incurred by the users 102 incurred during charging the vehicles during their particular uses. In the variablized cost approach shown in FIG. 2B, the accumulated cost at a significant number of miles (right side of the graph) may equate to the same overall cost for those miles in the ordinary approach shown in FIG. 2A (i.e., the maximum accumulated cost may be the same as shown in FIGS. 2A and 2B). In some examples, the energy cost per mile that may be assessed by the third-party owner of the batteries of the electric vehicles 104 may be set at a rate that includes additional profit for the third-party battery owner to provide a desired rate of investment return to the third party battery owner as compensation for the third-party's initial capital investment in vehicle batteries. When the vehicle batteries have reached the end of their useful life for vehicle use, the third party battery owner may then place those batteries into other uses, such as energy storage for homes, businesses and/or the energy grid.

FIG. 3 illustrates a flow chart of an exemplary approach for monitoring and enhancing utilization for a group of electric vehicles for multiple users (e.g., drivers, owners) who share the electric vehicles. The steps need not be carried out in the specific order illustrated in this example. As shown at step 302, battery usage of the electric vehicles is monitored using battery monitoring sensors at the electric vehicles for a plurality of users who share use of electric vehicles. At step 304, battery usage metrics for the batteries of the electric vehicles are determined based on the data of battery usage, and user impact metrics are determined based on the data of battery usage for the plurality of users, the user impact metrics being indicative of degrees of demand placed on the batteries associated with use habits (e.g., driving habits) of particular users. These metrics, and others, may be calculated by the remote monitoring system as explained above. At step 306, the battery usage metrics and the user impact metrics for the plurality of users are analyzed at a computer processing system of the remote monitoring system 106 to determine a particular user to assign to a particular electric vehicle in a given time period to counteract battery degradation of the battery in a particular electric vehicle. At step 308, the particular user is paired with the particular electric vehicle. The particular vehicle can then be made available to the particular user, e.g., through delivery of the vehicle to the particular user's location facilitated, e.g., through use a smart-phone application, or, e.g., through a communication to the user that the vehicle is ready for pickup at a suitable location.

Other steps can also be carried out. At step 310, a third party owner of the battery of the particular electric vehicle may be compensated based on battery usage of the particular electric vehicle during a time period, where the third party owner of the battery is different than an owner of the particular electric vehicle and different than the second entity that controls the remote monitoring system 106. At step 312, the battery usage metrics, charging history, and/or battery usage forecast can be analyzed to determine a particular battery charging profile for the battery of the particular vehicle to optimize performance (e.g., capacity) and battery life, e.g., a slow charge profile if the battery has recently been charged in a rapid manner. Such analysis to determine a suitable charging profile can be carried out according to a suitable rule-based algorithm or other algorithm, e.g., which may specify a slow charge profile, for instance, if a predetermined number of immediately preceding charges have been fast charges. At step 314, a surcharge owed to the third party can be determined if the user and/or vehicle owner charges the battery in a manner inconsistent with the particular battery charging profile, e.g., if the user charges the battery with a rapid charge profile when the particular identified charging profile was a slow charge profile.

Figure 4:
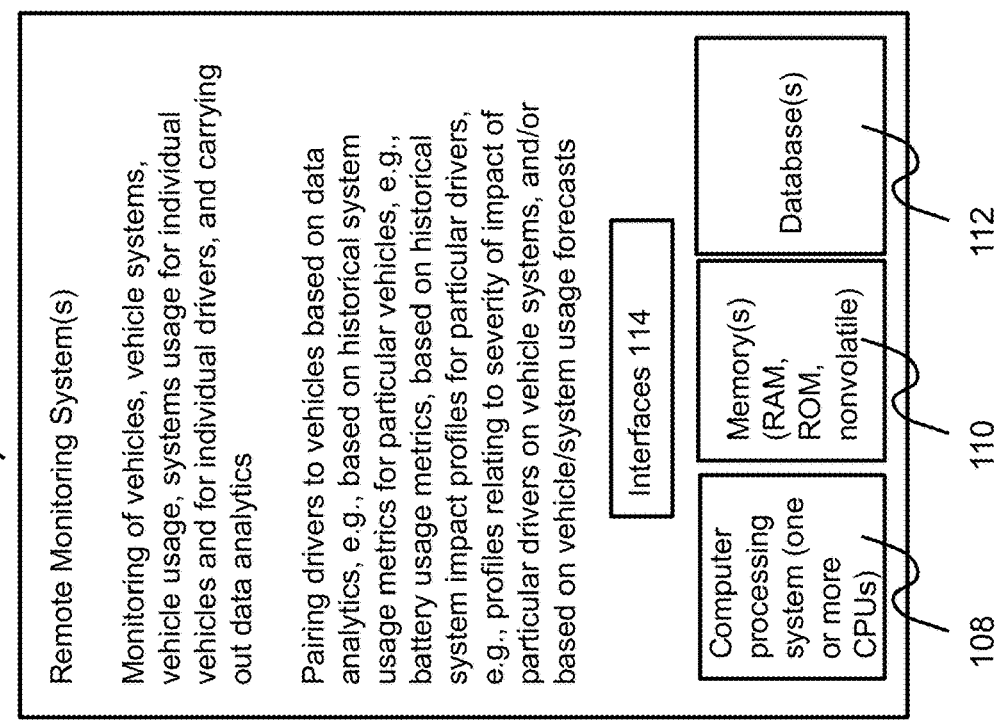
FIG. 4 illustrates another exemplary framework for an approach of monitoring and enhancing battery utilization for a group of electric vehicles according to an example of the disclosure.

FIG. 4 illustrates another exemplary framework for an approach for a method of monitoring and enhancing battery utilization for a group of electric vehicles. This is example is similar to the example of FIG. 1, except that in the example of FIG. 4, particular uses are being paired to particular vehicles of a shared-vehicle pool, instead of pairing particular users to particular vehicles. In other respects, FIG. 4 is like FIG. 1, and where applicable, the same reference numerals as in FIG. 1 have been retained for FIG. 4. This example may be implemented, for instance, for a pool of autonomously driven electric vehicles, i.e., vehicles driven without human drivers. In other respects, the prior discussion relating FIGS. 2-3 is equally applicable to the example of FIG. 4. As shown in FIG. 4, a plurality of uses 402 of a shared vehicle pool for multiple particular uses are to be paired with vehicles, such as electric vehicles, of a vehicle pool 104. In examples described herein, major subsystems of the vehicles 104 may be owned by a third party or parties who are different than the owners of the vehicles 104 themselves. A remote monitoring system 106 under the control of a second party different than the owners of the vehicles 104 communicates with the vehicles 104 and may communicate with entities who control the uses 402 via wireless and/or wired communication including via a network 116 such as the Internet, through smart phones equipped with suitable applications, tablets, and/or desktop or laptop computers. In some examples, a second party that controls the remote monitoring system 106 may also be the owner of vehicles 104.

The remote monitoring system(s) 106 is like that described for FIG. 1, and the vehicles 104 may include a host of sensors which communicate data to and may receive communication from the system 106, such as discussed above in connection with FIG. 1. For example, such sensors may include sensors for obtaining data for calculating usage impact metrics (relating to severity of particular types of uses on the vehicle systems including the battery) and battery usage metrics (relating to historical battery usage for particular batteries of vehicles). Such sensors may include sensors for measuring vehicle speed (for calculating metrics such as, e.g., average, median, and/or maximum speed as well as average, median and/or maximum acceleration and/or deceleration), braking force (for calculating metrics such as, e.g., average, median and/or maximum braking force), battery state of charge (for calculating metrics such as, e.g., average, median, and/or maximum state of charge), battery state of health (e.g., based on measured ability to retain charge and maximum charge attainable), battery current (for calculating metrics such as, e.g., average, median, and/or maximum battery current delivered to the powertrain), temperature (for calculating metrics such as, e.g., average, median, and/or maximum ambient outdoor temperature), GPS location (e.g., which may be used to provide numerical metrics indicative of a level of severity of terrain, e.g., numerical metrics indicative of temperate areas, mountainous areas, desert areas, etc.), and other suitable metrics that may be indicative of the severity of usage impact associated with types of uses on a vehicle. Such numerical metrics may be calculated for vehicle outings and/or for longer time periods such as the cumulative time of usage of the vehicle battery, may be combined in mathematical combinations including combinations with other previously mentioned numerical metrics, and may be normalized using any suitable normalizations, such as previously described herein. Such metrics may be directly or indirectly indicative of severity of demand placed on vehicle batteries. The remote monitoring system 106 carries out monitoring of vehicles, vehicle systems, vehicle usage, and systems usage for individual vehicles and for individual uses specified by entities who control those uses, and carries out data analytics on the data gathered from the vehicles and the vehicle systems. The specification of an intended use by an entity that is a repeat customer permits the monitoring system 106 to predict a same future intended use for a vehicle when a vehicle is requested by that entity, and this prediction assists the monitoring system to carry intelligent pairing of vehicles to uses to enhance battery utilization and performance and counteract battery degradation. In examples, the vehicles 104 may include various detectors and sensors for monitoring vehicle dynamics and usage and demand placed on vehicle systems during the use of the vehicles 104 by particular uses 402. For example, the vehicles may include units for monitoring location, speed, and direction, battery monitoring sensors in the form of electrical circuits for monitoring battery usage, battery discharge as a function of time, battery charging rates, and other suitable sensors for monitoring the health and status of other major systems of the vehicle and for detecting warning or fault conditions. Such data is stored in an onboard computer system with suitable memory and may be uploaded to the remote monitoring system 106 through wireless communication via a vehicle onboard wireless transceiver and/or via wired communication through a vehicle docking station(s) located at a specified location. Moreover, the utilization of GPS sensors, battery monitoring sensors (e.g., discharge monitoring circuits), permits the monitoring system to itself determine uses, e.g., through real-time access of maps from database 112, and through analysis of speed and other data to analyze the type of driving that is being incurred at a specific time for a specific vehicle.

The remote monitoring system 106 may calculate metrics of use impact on various vehicle systems, such as the vehicle battery, for individual uses 402 that share usage of the pool of vehicles 104. For example, the use impact metrics may relate to degrees of demand placed on the batteries and/or other vehicle systems associated with the driving requirements of particular uses. Uses that place significant strain on vehicles, e.g., with rapid acceleration and rapid deceleration, may be rated with metrics reflecting a greater level of severity and demand placed upon the battery system and other systems of a vehicle. Uses that place low strain on vehicles, with relatively slow acceleration and slow deceleration, may be rated with metrics reflecting a lesser level of severity and demand placed on the battery system and other subsystems of a vehicle. In order to lessen the severity of the demand over time placed upon battery systems of particular vehicles 104, the remote monitoring system 106 may select and pair a particular intended use 402 (the use being expected based on its association with a known entity requesting the vehicle) with a with a particular vehicle 104 based upon the historical battery usage and metrics derived therefrom for that vehicle 104 and based on usage impact metrics for the pool of uses 402. For example, the remote monitoring system may determine for a particular vehicle 104 that the vehicle 104 has been driven with a relatively severe impact on the battery by recent users of the vehicle. In such an instance the remote monitoring system 106 may pair a use 402 that characteristically places relatively low strain on vehicles with the particular vehicle 104 in an effort to achieve a more balanced usage of the battery of the particular vehicle 104 over time.

For example, the remote monitoring system may access previously calculated and metrics stored in database 112 associated with the historical usage of the battery of the particular vehicle such as, for example, average discharge rate for the battery, maximum recorded discharge rate for the battery, median recorded discharge rate for the battery, and/or other suitable metrics derived according to a battery management model designed to gauge the health of the battery. The remote monitoring system 106 may also access previously calculated usage metrics stored in database 112 associated with the historical usage patterns of particular uses 402 which share use of vehicles 104 in the vehicle pool, in particular, usage metrics such as battery usage metrics that are indicative of degrees of demand placed on batteries due to the usage habits of the uses 402. Based on those metrics for the multiple uses 402, the remote monitoring system may select a particular use 402 to be paired with a particular vehicle 104 to counteract battery degradation of the battery of that particular vehicle 104, so as to achieve better balance in the battery usage for a particular vehicle 104 and enhanced life and performance of the battery of the particular vehicle 104. Of course, the remote monitoring system 106 may carry out these types of analyses continually or at specified time intervals for all of the vehicles 104 and all of the uses 402 so as to continually pair particular uses 402 with particular vehicles 104 based on the most updated data in an effort to achieve a desirable balance of battery usage for all of the vehicles 104. In addition, the remote monitoring system 106 continually updates the database 112 with the most recent vehicle system usage data and use impact data collected from sensors at the vehicles 104, and also updates the associated vehicle system usage metrics and use impact metrics, which may change with time, at the database 112.

FIG. 5 illustrates a flow chart of an exemplary approach for monitoring and enhancing utilization for a group of electric vehicles for multiple uses of electric vehicles. This example is similar to that of FIG. 3, except that the impact metrics may pertain to uses of vehicles instead of users (drivers) of vehicles. This example may be implemented, for instance, for a pool of autonomously driven electric vehicles, i.e., vehicles driven without human drivers. In other respects, the prior discussion relating FIGS. 2-4 is equally applicable to the example of FIG. 5. The steps of FIG. 5 need not be carried out in the specific order illustrated in this example. As shown at step 502, battery usage of the electric vehicles is monitored using battery monitoring sensors at the electric vehicles for a plurality of uses of electric vehicles. At step 504, battery usage metrics for the batteries of the electric vehicles are determined based on the data of battery usage, and usage impact metrics are determined based on the data of battery usage for the plurality of uses, the usage impact metrics being indicative of degrees of demand placed on the batteries associated with particular uses. These metrics, and others, may be calculated by the remote monitoring system and explained above. At step 506, the battery usage metrics and the usage impact metrics for the plurality of drivers are analyzed at a computer processing system of the remote monitoring system 106 to determine a particular use to assign to a particular electric vehicle in a given time period to counteract battery degradation of the battery in a particular electric vehicle. At step 508, the particular use is paired with the particular electric vehicle.

Other steps can also be carried out. At step 510, a third party owner of the battery of the particular electric vehicle may be compensated based on battery usage of the particular electric vehicle during a time period, where the third party owner of the battery is different than an owner of the particular electric vehicle and different than the entity that controls the remote monitoring system 106. At step 512, the battery usage metrics, charging history, and/or battery usage forecast can be analyzed to determine a particular battery charging profile for the battery of the particular vehicle to optimize performance (e.g., capacity) and battery life, e.g., a slow charge profile if the battery has recently been charged in a rapid manner. At step 514, a surcharge owed to the third party can be determined party if the user and/or vehicle owner charges the battery in a manner inconsistent with the particular battery charging profile, e.g., if the user charges the battery with a rapid charge profile when the particular identified charging profile was a slow charge profile. In some examples, the entity that controls the remote monitoring system 106 may also be the entity that owns the vehicle batteries but does not own the vehicles 104, or the entity that controls the remote monitoring system 106 may own the vehicles 104 and the vehicle batteries.

FIGS. 6A and 6B illustrate an example of how the approaches described above can be beneficial for battery performance for electric vehicles. FIG. 6A shows exemplary maximum battery capacity for different electric vehicles A, B and C with either different users or different uses in an ordinary driving/ownership scenario. In other words, vehicle A is substantially always driven by the same user or user unit, e.g., of a family, or vehicle A is substantially always used for a particular dedicated use on behalf of an entity (e.g., as a delivery vehicle in an urban location). Similarly, vehicle B substantially always serves the same user or use, and likewise for vehicle C. The users, or dedicated uses, of vehicles A, B and C are different from one another in this ordinary scenario. As shown in FIG. 6A, maximum battery capacity, which is a measure of the health of the battery, varies as a function of miles driven for the batteries of the different vehicles A, B and C. In this example maximum battery capacity curve for vehicle A may pertain to a driver that drives vigorously and places high acceleration demands on the battery, or may pertain to a delivery vehicle in an urban environment that requires quick deliveries and many starts and stops. The maximum battery capacity curve for vehicle C may pertain to, for example, a driver that drives gently and places low acceleration demands on the battery, or to a use that involves primarily highway driving. The maximum battery capacity curve for vehicle B may pertain to, for example, average or mixed driving, or may pertain to a use of commuting to work. In contrast, FIG. 6B shows the improved and more uniform maximum battery capacity profiles for vehicles A, B and C when each is driven by multiple users, or according to multiple uses, in a multi-user (or multi-use), shared vehicle pool scenario with intelligent, dynamic pairing of users (or uses) and vehicles based on battery usage metrics and user/use impact metrics, to counteract battery degradation of the batteries of the electric vehicles. As shown in FIG. 6B, in a multi-user (or multi-use), shared vehicle pool scenario with intelligent, dynamic pairing of users/uses and vehicles, there may be significantly less variation in maximum battery capacity for different electric vehicles, which may permit enhanced utilization and performance of the batteries and electric vehicles overall.

As discussed above described approaches may have benefits over conventional approaches for utilization and batteries for electric vehicles, including better utilization of electric vehicles, lower costs of ownership and driving for owners and/or users of the electric vehicles, and improved batter capacity performance and improved life for the batteries of the electric vehicles.

The methods and systems described herein may be implemented using any suitable computer processing system with any suitable combination of hardware, software and/or firmware. As shown in FIGS. 1 and 4, users 102, entities that control uses 402, and vehicles 104 can interact with remote monitoring system 106 hosted on one or more computer servers through a network 116. The computer processing system 108 may execute software operations, program instructions or routines to implement calculations and analyses described above. Such program instructions, accumulated data, and processed data may be stored one or more non-transitory computer-readable memories 110 and/or one or more data stores for in databases 112. Communications may be carried out according to a client server architecture whereby users 102 and vehicles 104 may access the monitoring system 106 via one or more servers via one or more networks 116.

The systems may include element managers, real-time data buffers, conveyors, file input processors, database indices, data buffers and data managers for managing data and processing. The system 106 may also include multiple displays, display interfaces, input/output devices such as a keyboards, microphones, mice, touchscreens and the like for permitting administrators or support personnel to manage the system 106.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those skilled in the art that various modifications can be made thereto without departing from the scope of the invention as set forth in the claims.

What is claimed is:

1. A method of monitoring and enhancing battery utilization for a group of electric vehicles, comprising:
    monitoring data of battery usage of electric vehicles using battery monitoring sensors at the electric vehicles for a plurality of users who share use of electric vehicles;
    determining battery usage metrics for the batteries of the electric vehicles based on the data of battery usage;
    determining user impact metrics based on sensor measurements and measured quantities of the battery usage metrics corresponding to driving of the electric vehicles by the plurality of users;
    analyzing the battery usage metrics and the user impact metrics for the plurality of users at a computer processing system to balance the user impact metrics and the battery usage metrics between the plurality of electric vehicles over time by setting assignments of different ones of the plurality of users to each of the electric vehicles over time;

analyzing the battery usage metrics, charging history, and/or battery usage forecast to determine a particular battery charging profile that indicates how quickly to charge the battery of a particular vehicle; and determining a surcharge owed to a third party for charging the battery more rapidly than indicated by the particular battery charging profile.

2. The method of claim 1, wherein the battery usage metrics for the batteries comprise at least one of an average battery discharge rate, a maximum battery discharge rate, and a median battery discharge rate.

3. The method of claim 1, wherein the user impact metrics further comprise at least one of average acceleration, median acceleration, and maximum acceleration attributable to the plurality of users.

4. The method of claim 1, comprising determining compensation for an owner of the battery of the particular electric vehicle based on battery usage of the particular electric vehicle during a time period, the owner of the battery being different than an owner of the particular electric vehicle.

5. The method of claim 1, wherein the data of battery usage comprises battery charging rates.

6. The method of claim 1, wherein determining the user impact metrics comprises determining braking habits comprising deceleration, braking force, or braking use from the sensors at the electric vehicles.

7. The method of claim 1, wherein determining the user impact metrics comprises determining HVAC use from the sensors at the electric vehicles.

8. A system for monitoring and enhancing battery utilization for a group of electric vehicles, comprising:
a computer processing system; and
a computer memory,
wherein the processing system is configured to execute steps comprising:
receiving data of battery usage of electric vehicles obtained with battery monitoring sensors at the electric vehicles for a plurality of users who share use of electric vehicles;
determining battery usage metrics for the batteries of the electric vehicles based on the data of battery usage;
determining user impact metrics based on sensor measurements and measured quantities of the battery usage metrics corresponding to driving of the electric vehicles by the plurality of users;
analyzing the battery usage metrics and the user impact metrics for the plurality of users to balance the user impact metrics and the battery usage metrics between the plurality of electric vehicles over time by setting assignments of different ones of the plurality of users to each of the electric vehicles over time;
analyze the battery usage metrics, charging history, and/or battery usage forecast to determine a particular battery charging profile that indicates how quickly to charge the battery of a particular vehicle; and
determine a surcharge owed to a third party for charging the battery more rapidly than indicated by the particular battery charging profile.

9. The system of claim 8, wherein the battery usage metrics for the batteries further comprise at least one of an average battery discharge rate, a maximum battery discharge rate, and a median battery discharge rate.

10. The system claim 8, wherein the user impact metrics further comprise at least one of average acceleration, median acceleration, and maximum acceleration attributable to the plurality of users.

11. The system of claim 8, wherein the data of battery usage comprises battery charging rates.

12. The system of claim 8, wherein determining the user impact metrics comprises determining braking habits comprising deceleration, braking force, or braking use from the sensors at the electric vehicles.

13. The system of claim 8, wherein determining the user impact metrics comprises determining HVAC use from the sensors at the electric vehicles.

14. A non-transitory computer readable medium comprising program instructions for monitoring and enhancing battery utilization for a group of electric vehicles, the program instructions when executed causing a computer processing system to execute steps comprising:
receiving data of battery usage of electric vehicles using battery monitoring sensors at the electric vehicles for a plurality of users who share use of electric vehicles;
determining battery usage metrics for the batteries of the electric vehicles based on the data of battery usage;
determining user impact metrics based on sensor measurements and measured quantities of the battery usage metrics corresponding to driving of the electric vehicles by the plurality of users;
analyzing the battery usage metrics and the user impact metrics for the plurality of users to balance the user impact metrics and the battery usage metrics between the plurality of electric vehicles over time by setting assignments of different ones of the plurality of users to each of the electric vehicles over time;
analyze the battery usage metrics, charging history, and/or battery usage forecast to determine a particular battery charging profile that indicates how quickly to charge the battery of a particular vehicle; and
determine a surcharge owed to a third party for charging the battery more rapidly than indicated by the particular battery charging profile.

15. The non-transitory computer readable medium of claim 14, wherein the battery usage metrics for the batteries comprise at least one of an average battery discharge rate, a maximum battery discharge rate, and a median battery discharge rate.

16. The non-transitory computer readable medium of claim 14, wherein the user impact metrics further comprise at least one of average acceleration, median acceleration, and maximum acceleration attributable to the plurality of users.

17. The non-transitory computer readable medium of claim 14, wherein the data of battery usage comprises battery charging rates.

18. The non-transitory computer readable medium of claim 14, wherein determining the user impact metrics comprises determining braking habits comprising deceleration, braking force, or braking use from the sensors at the electric vehicles.

19. The non-transitory computer readable medium of claim 14, wherein determining the user impact metrics comprises determining HVAC use from the sensors at the electric vehicles.

* * * * *